US010949956B2

United States Patent
Neulander et al.

(10) Patent No.: US 10,949,956 B2
(45) Date of Patent: Mar. 16, 2021

(54) ENHANCED SPECULAR REFLECTIONS FOR INSERTED CONTENT

(71) Applicant: GOOGLE LLC, Mountain View, CA (US)

(72) Inventors: Ivan Neulander, Los Angeles, CA (US); Jeremy Chernobieff, Irvine, CA (US)

(73) Assignee: GOOGLE LLC, Mountain View, CA (US)

( * ) Notice: Subject to any disclaimer, the term of this patent is extended or adjusted under 35 U.S.C. 154(b) by 92 days.

(21) Appl. No.: 16/374,406

(22) Filed: Apr. 3, 2019

(65) Prior Publication Data
US 2019/0311467 A1   Oct. 10, 2019

Related U.S. Application Data

(60) Provisional application No. 62/653,889, filed on Apr. 6, 2018.

(51) Int. Cl.
*G06T 5/00* (2006.01)
*G06T 15/50* (2011.01)
(Continued)

(52) U.S. Cl.
CPC .............. *G06T 5/009* (2013.01); *G06T 5/002* (2013.01); *G06T 15/503* (2013.01);
(Continued)

(58) Field of Classification Search
CPC ....... G06T 5/009; G06T 5/002; G06T 15/503; G06T 19/006; G06T 15/506; H04N 5/2351; H04N 5/272
See application file for complete search history.

(56) References Cited

U.S. PATENT DOCUMENTS 5,854,632 A * 12/1998 Steiner .................. G06T 15/506
                                                       345/426
2017/0154463 A1 *  6/2017 von Cramon ........... G06T 15/04

FOREIGN PATENT DOCUMENTS

WO    2006024873 A2    3/2006

OTHER PUBLICATIONS

Kronander et al. "Photorealistic Rendering of Mixed Reality Scenes." Computer Graphics Forum, State of the Art Report, vol. 34, No. 2, 2015, pp. 643-665 (Year: 2015).*

(Continued)

*Primary Examiner* — Jon Chang
(74) *Attorney, Agent, or Firm* — Brake Hughes Bellermann LLP

(57) ABSTRACT

Systems and methods for enhanced specular reflections are provided. An example method may include determining a first portion of a specular reflection associated with a computer-generated object based on a first contribution from an environment map component at a shading point of the computer-generated object and determining a second portion of the specular reflection associated with the computer-generated object based on a second contribution from a camera feed component at an intersection point of a camera feed and a reflection vector associated with the environment map component. The example method may further include determining the specular reflection, at the shading point, associated with the computer-generated object based on a blending of the first and second portions of the specular reflection.

20 Claims, 7 Drawing Sheets

(51) Int. Cl.
*G06T 19/00* (2011.01)
*H04N 5/235* (2006.01)
(52) U.S. Cl.
CPC ......... *G06T 19/006* (2013.01); *H04N 5/2351* (2013.01); *G06T 15/506* (2013.01)

(56) References Cited

OTHER PUBLICATIONS

Pessoa et al. "Photorealistic Rendering for Augmented Reality: A Global Illumination and BRDF Solution." IEEE Virtual Reality Conference, Mar. 20, 2010, pp. 3-10 (Year: 2010).*
Anderson, Paul et al., "Embedded Reflection Mapping", Apr. 8, 2003, retrieved from: http://arxiv.org/PS_cache/cs/pdf/0304/0304011.pdf, on Jan. 1, 2006, XP002366141.
Anonymous: "Reflection Mapping", Wikipedia, Feb. 13, 2018, retrieved from: https://en.wikipedia.org/w/index.php?title=Reflection_mapping&oldid=825365866 on Jun. 2, 2019, XP055593263.
International Search Report and Written Opinion for Application No. PCT/US2019/025792, dated Aug. 9, 2019, 17 pages.
"Screen Space Reflections", Epic Games, Unreal Engine (https://docs.unrealengine.com/en-usiEngine/Rendering/PostProcessEffects/ScreenSpaceReflection), Jan. 31, 2018, 2 pages.
McGuire, Morgan , et al., "Plausible Environment Lighting in Two Lines of Code", Casual Effects (http://casual-effects.blogspot.com/2011/08/plausible-environment-lighting-in-two.html), Aug. 16, 2013, 8 pages.

* cited by examiner

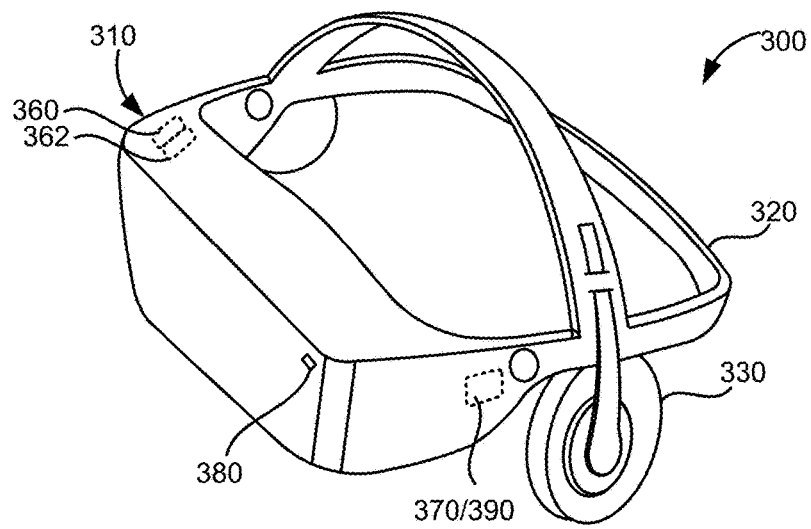
FIG. 3A
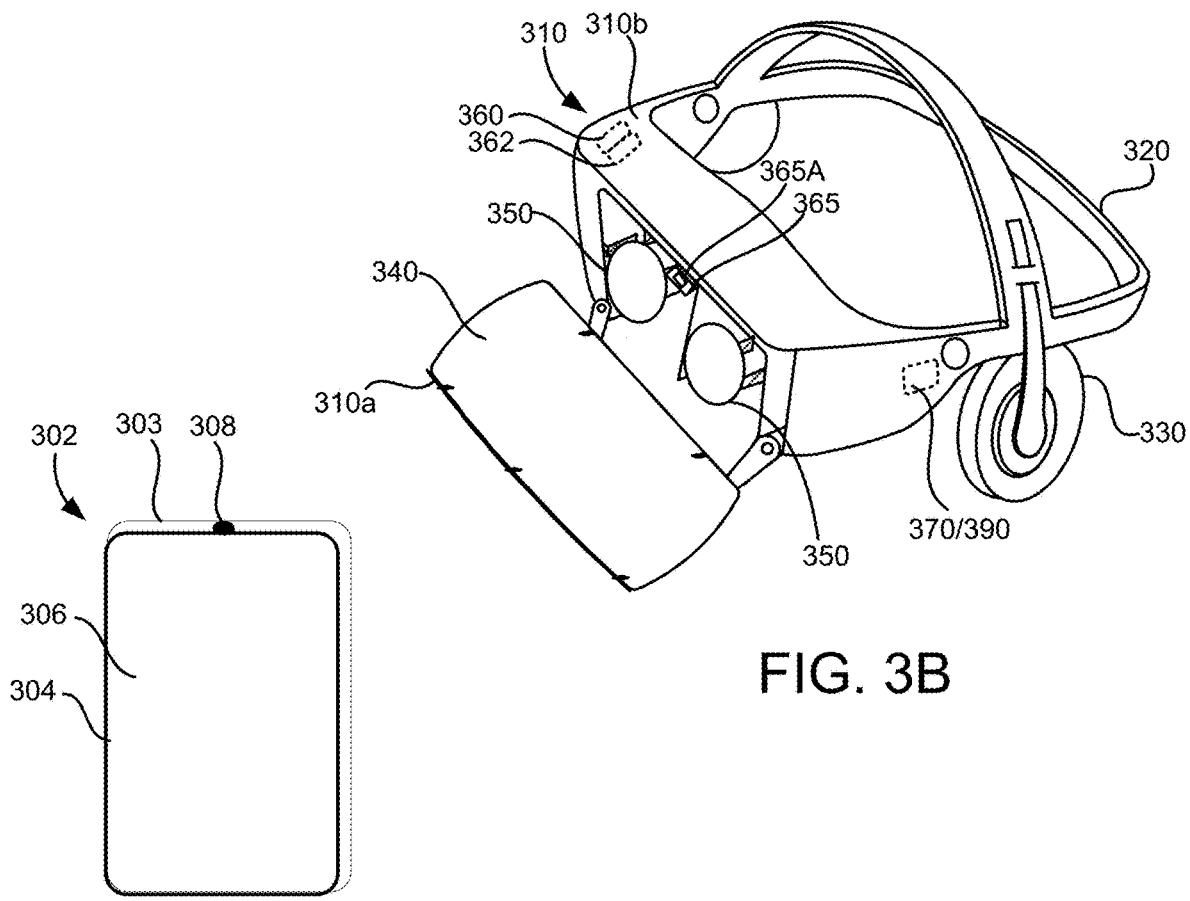
FIG. 3B
FIG. 3C

600

Determine a first portion of a specular reflection associated with a computer-generated object
610

Determine a second portion of the specular reflection associated with the computer-generated object
620

Determine the specular reflection, at the shading point, associated with the computer-generated object based on a blending of the first and second portions of the specular reflection
630

FIG. 6

ENHANCED SPECULAR REFLECTIONS FOR INSERTED CONTENT

CROSS-REFERENCE TO RELATED APPLICATION

This application claims priority to and the benefit of U.S. Provisional Patent Application No. 62/653,889, filed on Apr. 6, 2018, entitled "ENHANCED SPECULAR REFLECTIONS FOR INSERTED CONTENT," the disclosure of which is incorporated by reference herein in its entirety.

BACKGROUND

Content may be inserted into an image or a user's field of view. For example, an augmented reality (AR) system may generate an immersive augmented environment for a user by inserting content. The immersive augmented environment can be generated by superimposing computer-generated content in a user's field of view of the real world. For example, the computer-generated content can include three-dimensional entities, labels, textual information, images, sprites, etc. These images may be displayed at a position in the user's field of view so as to appear to overlay an object in the real world. Similarly, the computer-generated content may be overlaid on a displayed image. The lighting applied to the inserted content may impact how well the inserted content fits with the rest of the image.

SUMMARY

This disclosure describes systems and methods for enhanced specular reflections for inserted content. In one implementation, the example method may include determining a first portion of a specular reflection associated with a computer-generated object based on a first contribution from an environment map component at a shading point of the computer-generated object and determining a second portion of the specular reflection associated with the computer-generated object based on a second contribution from a camera feed component at an intersection point of a camera feed and a reflection vector associated with the environment map component. The example method may further include determining the specular reflection, at the shading point, associated with the computer-generated object based on a blending of the first and second portions of the specular reflection.

The details of one or more implementations are set forth in the accompanying drawings and the description below. Other features will be apparent from the description and drawings, and from the claims.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIGS. 3A, 3B, and 3C are diagrams depicting an example head-mounted display device and controller, in accordance with implementations as described herein.

FIG. 6 illustrates a flowchart of an example method of determining specular reflections, in accordance with implementations described herein.

DETAILED DESCRIPTION

Figure 1:
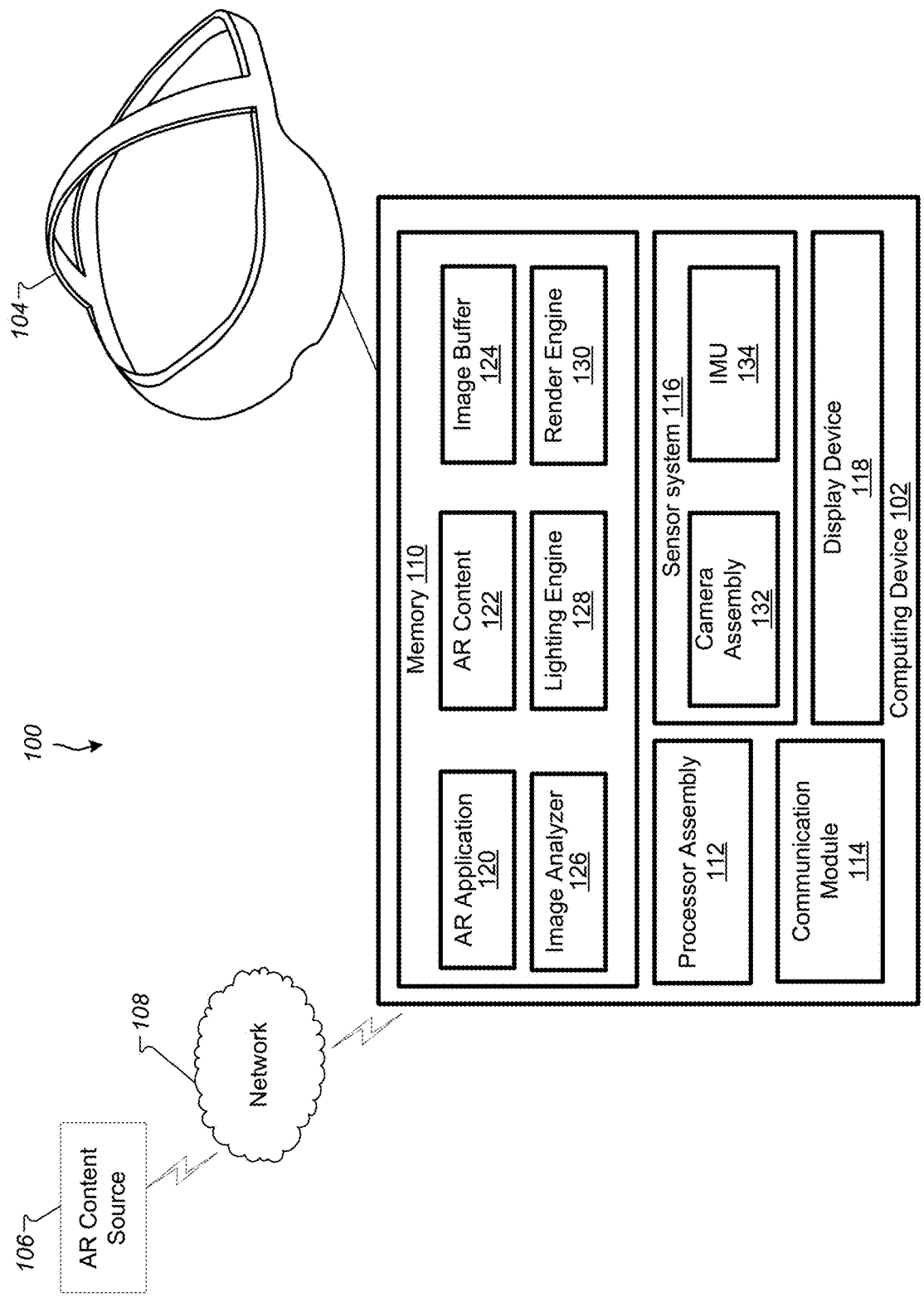
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated (CG) content into a user's perception of the physical space surrounding the user. The computer-generated content may include three-dimensional entities, labels, textual information, images, sprites, three-dimensional entities, etc. In some implementations, the content is inserted for entertainment, educational, or informational purposes.

An example AR system is a portable electronic device, such as a smartphone, that includes a camera and a display device. The portable electronic device may capture images using the camera and show AR images on the display device that include computer-generated content overlaid upon the images captured by the camera. Another example AR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

An additional example AR system includes a HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated content is inserted into an image, lighting may be applied to the content so that the content more closely matches the rest of the image. For example, a three-dimensional model may be rendered using light sources or an environmental light map that approximates the light conditions captured in the image. AR systems may need to refresh images displayed to a user in real time at a high rate, for example, 24 frames per second (FPS), 30 FPS, 60 FPS, or another rate. Traditional techniques for determining or estimating lighting in a scene from an image may require so many computations (or processor cycles) that it cannot be performed in an AR system. Some traditional techniques require prior information about the lighting in an environment, which may not be available for many of the environments in which an AR system is used.

The techniques described herein incorporate details from a camera feed into specular reflections to improve realism of inserted content, e.g., a computer-generated (CG) object. In other words, the techniques describe incorporating details from the camera feed of a device to improve the appearance of an inserted object. In one implementation, the improvements or enhancements may be achieved by using the camera feed (e.g., images, videos, etc.) captured by a device's camera and incorporating the camera feed (e.g., at least portions of the camera feed) into specular reflections that are rendered on inserted CG objects to enhance the rendered appearance of surfaces that are commonly found in nature.

A specular reflection may be defined as a type of surface reflection where the angle of reflection is equal to the angle of incidence and where the incident light is reflected (mostly) into a single outgoing direction. Specular reflection occurs for most smooth and polished surfaces, e.g., mirrors, glossy surfaces, and metallic surfaces when light reflects from a surface without absorption and without significant scattering and often revealing visual details from a region of space that is reflected. In order to convincingly render shiny computer-generated objects inserted into a camera feed (e.g., image or video feed), the specular reflections on the surface of the computer-generated object may be captured and the details from the camera feed may be incorporated into the specular reflections to noticeably improve realism of the inserted computer-generated object. This may enhance user immersion and experience, as described in detail below.

The accurate rendering of specular reflections requires knowledge of incoming light from all directions in the surrounding environment at high angular resolution. As a typical camera on a device covers only a narrow solid angle (e.g., 75° by 35°), all the information that is required or needed (e.g., on which to base reflected radiance) may not be available. However, the information that is available from the camera feed may be blended with a synthetic representation of the lighting environment (e.g., environment map) to improve realism beyond what would otherwise be possible without the techniques described in this disclosure. For instance, the specular reflection may be split or partitioned into two components (e.g., at least two components), an environment map component and a camera feed component. The two components are then blended (e.g., combined) based on a function of an angle between a negated view vector (e.g., a vector in a direction opposite to a view vector) and a surface normal vector. For example, in one implementation, specular reflection for enhancing user experience may be based on determining an environment map component at a shading point of a computer-generated object, determining a camera feed component at an intersection point of a reflection vector associated with the environment map component and a camera feed, and determining a specular reflection (or enhanced specular reflection) at the shading point based on a blending of the environment map component and the camera feed component.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, an AR content 122, an image buffer 124, an image analyzer 126, a lighting engine 128, and a render engine 130. The computing device 102 may also include various user input components (not shown) such as a controller that communicates with the computing device 102 using a wireless communications protocol. In some implementations, the computing device 102 may be a mobile device (e.g., a smart phone) configured to provide or output AR content to a user via the HMD 104. For example, the computing device 102 and the HMD 104 may communicate via a wired connection (e.g., a Universal Serial Bus (USB) cable) or via a wireless communication protocol (e.g., Wi-Fi, BlueTooth, Zigbee, etc.). Additionally or alternatively, the computing device 102 may be a component of the HMD 104 and may be contained within a housing of the HMD 104.

The memory 110 may include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). In some implementations, for example, if a GPU is present, some image/video rendering tasks, such as shading content based on determined lighting parameters, may be offloaded to the GPU.

The communication module 114 includes one or more devices for communicating with other computing devices, such as the AR content source 106. The communication module 114 may communicate via wireless or wired networks, such as the network 108.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combination(s) of sensors.

The IMU 134 detects motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to in turn, detect and track the user's gaze direction and head movement.

In some implementations, the AR application may use the sensor system 116 to determine a location and orientation of a user within a physical space and/or to recognize features or objects within the physical space.

The camera assembly 132 captures images and/or videos of the physical space around the computing device 102. The camera assembly 132 may include one or more cameras. The camera assembly 132 may also include an infrared camera.

The AR application 120 may present or provide the AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. For example, the content may be generated with lighting that substantially matches the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images. The polygonal meshes may be shaded based on various lighting parameters.

The AR application 120 may use the image buffer 124, image analyzer 126, lighting engine 128, and/or render engine 130 to generate images for display via the HMD 104 based on the AR content 122. For example, the AR application 120 may use the image buffer 124, image analyzer 126, lighting engine 128, and/or render engine 130 to determine an environment map component at a shading point of a computer-generated object, determine a camera feed component at an intersection of a reflection vector associated with the environment map component and a camera feed, and determine a specular reflection at the shading point based on a blending of the environment map component and the camera feed component.

In some implementations, the image buffer 124 is a region of the memory 110 that is configured to store one or more images. In some implementations, the computing device 102 stores images captured by the camera assembly 132 as a texture within the image buffer 124. Alternatively or additionally, the image buffer may also include a memory location that is integral with the processor assembly 112, such as a dedicated random access memory (RAM) on a GPU.

In some implementations, the image analyzer 126, lighting engine 128, and render engine 130 may include instructions stored in the memory 110 that, when executed by the processor assembly 112, cause the processor assembly 112 to perform operations described herein to generate an image or a series images that are displayed to the user (e.g., via the HMD 104).

The AR application 120 may update the AR environment based on input received from the camera assembly 132, the IMU 134, and/or other components of the sensor system 116. A position and orientation of the HMD 104 may be detected and tracked based on data provided by the sensors included in the IMU 134. The detected position and orientation of the HMD 104 may allow the system to in turn, detect and track the user's position and orientation within a physical space. Based on the detected position and orientation, the AR application 120 may update the AR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
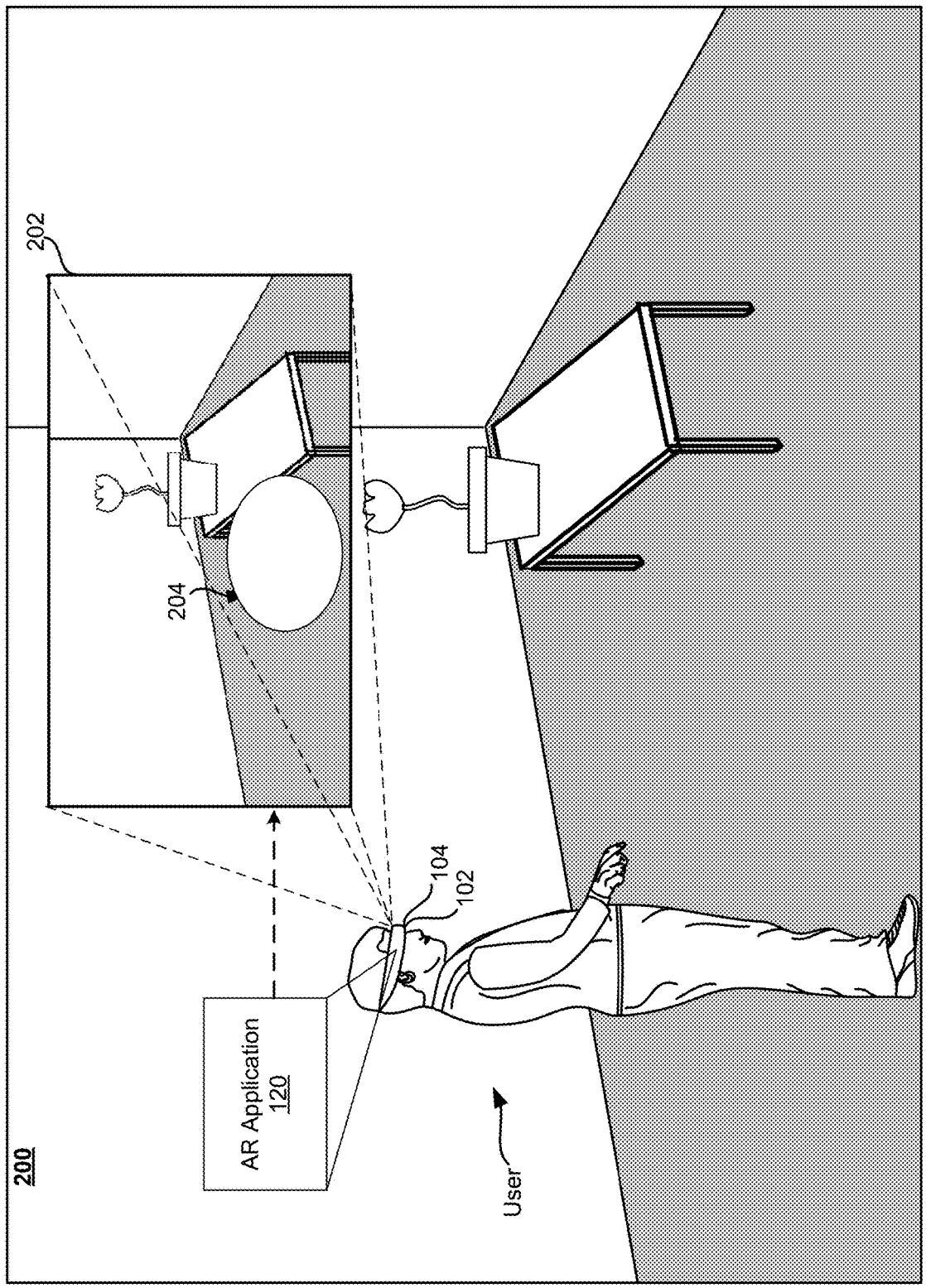
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The AR environment 202 includes inserted content 204 that is displayed over an image of the physical space 200. In an example implementation, the content 204 may be a sphere that is inserted into the AR environment 202. In such an example implementation, a subtle reflection along silhouette edges of shiny surfaces of the sphere that is driven by the camera feed may be introduced to enhance the specular reflections. This works well as the reflection vectors are not too far from the view vector and thereby allowing them to be reasonably approximated from the visible pixels of the camera feed and blended with a synthetic environment map.

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 204 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are stored, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to in turn, detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
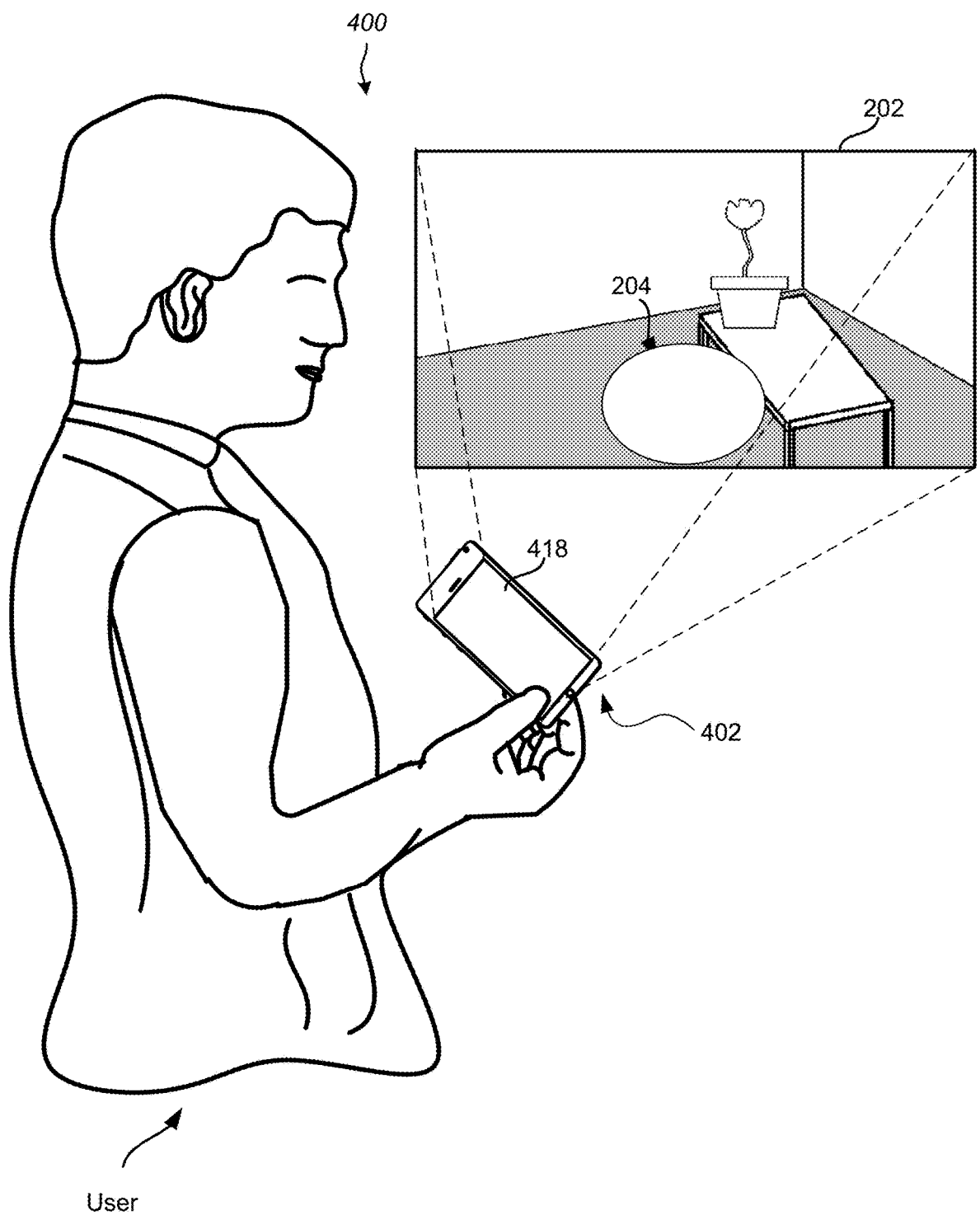
FIG. 4 is a schematic view of a user experiencing the AR environment via an example portable electronic device.

FIG. 4 is a schematic view 400 of a user experiencing the AR environment 202 via an example portable electronic device 402. The portable electronic device 402 is an example of the computing device 102. The portable electronic device 402 may be a smartphone, a tablet, or another type of portable computing device. In this example, the user experiences the AR environment through a display device 418 of the portable electronic device. For example, the display device 418 may include a screen that can show images and/or videos.

Figure 5:
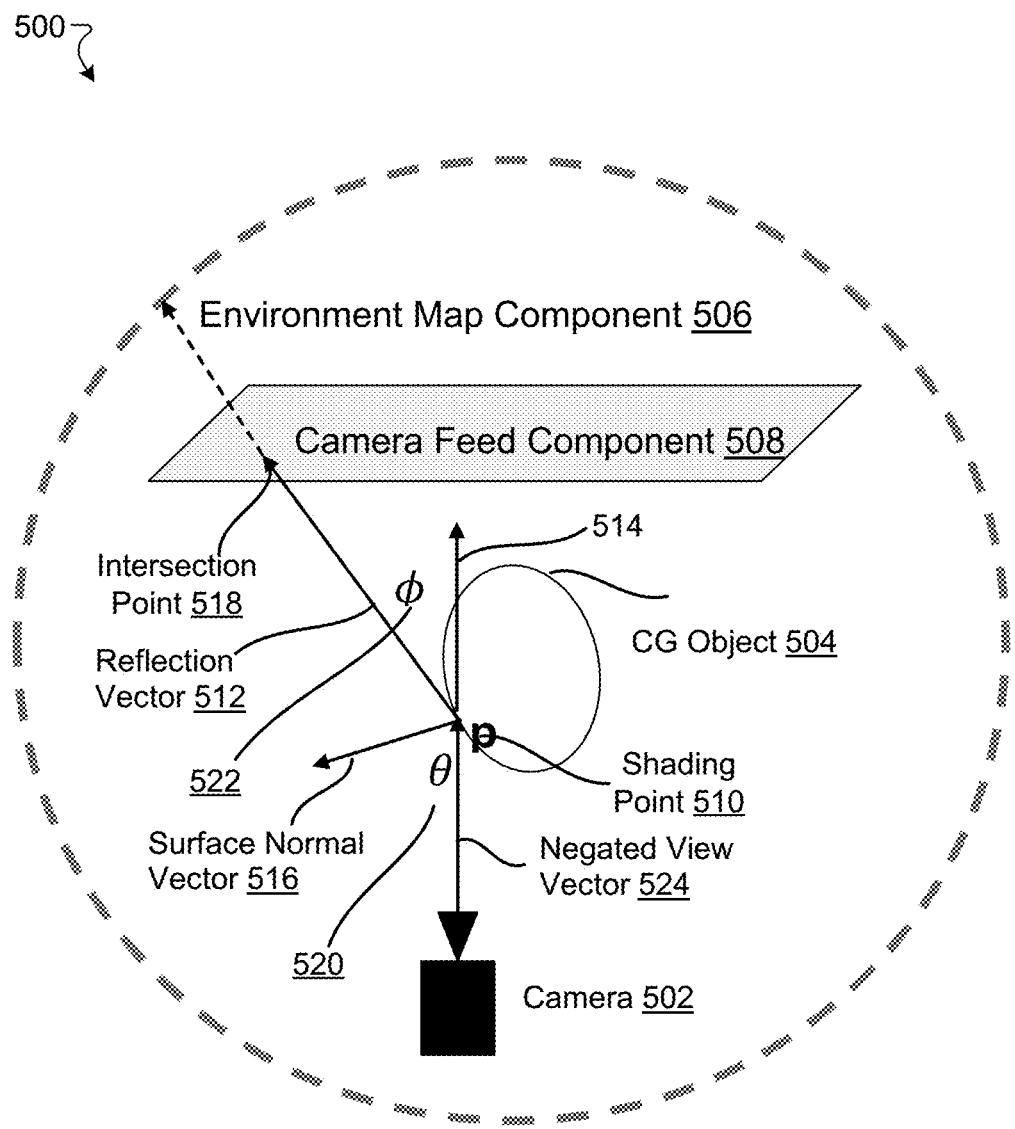
FIG. 5 is a diagram of an example implementation of enhanced specular reflections, in accordance with implementations described herein.

FIG. 5 illustrates an example implementation 500 of determining specular reflections for inserted content. In one example implementation, specular reflection(s) (or enhanced specular reflections) of inserted content, e.g., an inserted computer-generated object 504, which may be the same as or similar to 204 of FIG. 2, may be determined at a computing device.

In one example implementation, FIG. 5 may include a camera 502, a computer-generated object 504, an environment map component (Ce) 506, a camera feed component (Cc) 508, a shading point 510, a reflection vector 512, a view vector 514, a surface normal vector 516, an intersection point 518, and/or a negated view vector 524 (opposite to a view vector 514). An angle θ 520 represents the measure of an angle between negated view vector 524 and surface normal vector 516, and angle Φ 522 represents the measure of an angle between view vector 514 and reflection vector 512. In some implementations, for example, specular reflection associated with computer-generated object 504 may be determined based on blending of contributions from environment map and camera feed components (e.g., environment map component 506 and camera feed component 508).

For example, contribution from environment map component 506 (e.g., first contribution) may determined from an environment map represented by, for example, a giant sphere that surrounds camera 502. The environment map component 506 may be determined from the environment map using any environment mapping technique. An environment mapping technique may be an image-based lighting technique for approximating the appearance of a reflective surface using texture image(s), e.g., pre-computed texture images. In one example implementation, cube mapping may be used for determining environment map component 506. For example, the environment may be projected onto the sides of a cube and stored as six textures or unfolded into six regions of a single texture.

In some implementations, the contribution from environment map component 506 may be a synthetic map (e.g., a cube map) of a fixed scene. The map may be created (e.g., synthesized) from a high-dynamic range capture which may be convolved (e.g., blurred), for example, using a filter, e.g., cosine lobe filter, to simulate a pre-defined specular reflectance lobe. The pre-convolution may produce physically accurate specular highlights for surfaces of very-low roughness. In some implementations, in order to handle surfaces of higher roughness, the environment may be blurred, for example, by a specific amount, using a filter (e.g., mipmap filter). The cosine lobe pre-convolution and mipmap based blurring techniques are fast and/or convenient ways to compute synthetic specular reflections from an image-based light source (IBL). In some implementations, the blurring may be applied in varying degrees at render time. For example, the blurring may be applied by altering the mipmap level of detail (LOD) level based on a measure of the specular roughness (e.g., which may be performed in a way similar to specular reflections from the synthetic cube map). In some implementations, this approach may provide an inexpensive approximation to the correct surface bidirectional reflectance distribution function (BRDF).

In an example implementation, camera 502 may capture various frames of an image (referred to as camera feed) and the color of a pixel at an intersection point 518, referred to as camera feed component 508, may represent the color that may be used for blending with the environment map component 506 to generate specular reflection at shading point 510. Intersection point 518 may be a point of intersection of reflection vector 512 and the camera feed. For instance, intersection point 518 may be a point of intersection of reflection vector 512 and camera feed plane, which for example, may be a distant plane squarely facing camera 502 and sized to fill the camera's view, onto which the camera feed image is projected. In an example implementation, reflection vector 512 may originate at shading point 510 and may extend in environment map component 506 and may pass through the camera feed. The camera 504 may be at the shading point 510 or any other point. In some implementations, the camera feed may be blurred based on surface roughness, for example, to simulate a specular lobe that is consistent with that of the cube map, as described above. In other words, the environment map and the camera feed may be blurred in a consistent way to achieve proper blending between the two components. However, in some implementations, there may be some minor differences between the blurring of the camera feed and the blurring of the cube map. For example, pre-convolution may be skipped with the blurring of the camera feed.

The specular reflection at shading point 510 may be determined in several ways. In some implementations, the specular reflection may be determined based on a blending of environment map and camera feed components. In an example implementation, the specular reflection may be determined by computing a dot product of reflection and view vectors (e.g., dot product of reflection vector 512 and view vector 514). In some implementations, prior to computing of the dot product for determining the specular reflection, the vectors (e.g., reflection and view vectors) may be normalized to a length of one to yield, for example, a cosine of the angle between the two vectors, clamped to a minimum value of zero, and raised to a fifth power, as shown below at equation (1). In some implementations, the value of $\cos \theta$, however, may be computed indirectly via $\cos \varphi$, where $\cos \gamma$ is a dot product between a unit view vector and a unit reflection vector (e.g., based on normalization to a length of one) and $\cos \theta = (1-\cos^2 \varphi)^{1/2}$.

$$b=(1-\cos \theta)^5 \qquad (1)$$

$$C_f=(1-b)C_c+bC_e \qquad (2)$$

In the above equations, $C_f$ represents the specular reflection, $C_c$ represents camera feed component, and $C_e$ represents environment map component. The above equations (1) and (2) are closely related to an estimation of Fresnel reflectance (also known as Schilck approximation) and can be used for determining specular reflection as the reflectivity of shiny surfaces are highly view-dependent.

FIG. 6 is a flowchart of an example method 600 for determining specular reflections. In an example implementation, the method 600 may be performed by computing device 102 to provide, for example, better AR experience to a user.

At block 610, a computing device may determine a portion of a specular reflection associated with a computer-generated object. For example, in one implementation, computing device 102 may determine a first portion of a specular reflection associated with a computer-generated object (e.g., computer-generated object 504). The first portion, in some implementations, may be determined based on a contribution (e.g., a first contribution) from an environment map component (e.g., environment map component 506). The environment map component 506 may be an environment map component at a shading point (e.g., shading point 510) and may be determined from a scene (e.g., image, video, etc.) of the surrounding environment. In some implementations, environment map component 506 may be determined using environment mapping techniques. An environment mapping technique may be generally defined as approximating the appearance of a reflective surface using a texture image (e.g., a precomputed texture image). In an example implementation, cube mapping may be used to determine environment map component 506 at shading point 510.

At block 620, the computing device may determine a second portion of the specular reflection associated with the computer-generated object. For example, in one implementation, computing device 102 may determine the second portion of the specular reflection associated with the computer-generated object (e.g., computer-generated object 504). The second portion, in some implementations, may be determined based on a contribution (e.g., a second contribution) from a camera feed component (e.g., camera feed component 508) of a camera feed at an intersection point (e.g., intersection points 518). The intersection point 518 may be an intersection point of the camera feed and a reflection vector (e.g., reflection vector 512). In an example implementation, the reflection vector 518 may associated with environment map component 506.

At block 630, the computing device may determine the specular reflection at the shading point based on a blending of the first and second portions of the specular reflection For example, in one implementation, computing device 102 may determine the specular reflection at the shading point (e.g., shading point 510) based on a blending of the first component of the specular reflection and a second portion of the specular reflection (e.g., first and second portions of the specular reflection determined as described above at blocks 610 and 620).

In some implementations, the blending of the first and second portions may be based on angle between a negated view vector (e.g., 524) and a surface normal vector (e.g., 516). For example, based on equations (1) and (2) described above, reflectivity may become significantly stronger at grazing angles (e.g., a beam nearly parallel to the surface of the computer-generated object 504) rather than viewed straight on. In an example implementation, for example, the equation (2) used for determining the specular reflection based on the blending between the environment map component 506 and the camera feed component 508 may include more of the camera feed (e.g., biased in favor of camera feed component 508) as reflection vector 512 tends to land within the bounds of the available camera image, for example, within a narrow cone in front of camera 502. In one example implementation, when reflection vector 512 may land significantly to the side or behind camera 502, the specular reflection may be determined by blending environment map component 506 and camera feed component 508 in favor (e.g., biased) of environment map component 506 as environment map component 506 may provide synthetic information for all directions.

Light is reflected differently by different computer-generated objects. For example, for smooth/shiny objects, perfect mirror images are generally received. The color of the pixels of the camera feed may be used for blending with the environment map component 506. However, for some specular surfaces which are not that smooth, e.g., rougher surfaces such as brushed aluminum, non-shiny plastic, etc., the light may get scattered. In some implementations, the images from the camera feed may be blurred in the reflection in the mipmap filter. In other words, instead of using a color of a particular pixel in the camera feed, an average color of multiple pixels within some box centered around the intersection point is used. In other words, different specular lobes may be simulated for environment map component 506 and camera feed component 508 by blurring the corresponding textures, as described above. In some implementations, the blurring may be applied in varying degrees at render time. This may be efficiently implemented by altering the mipmap level of detail (LOD) level based on a measure of the specular roughness (performed in way similar to specular reflections from the synthetic cube map). This provides an inexpensive approximation to the correct surface bidirectional reflectance distribution function (BRDF). In some implementations, the blurring (e.g., consistent blurring) of the two textures (e.g., environment map component and camera feed component) may produce a plausible blend for enhancing specular reflection of the inserted content.

In some implementations, the camera feed texture may be applied to an infinite plane at infinite distance. In other words, camera 502 may be considered as being coincident with shading point 510, and any point along reflection vector 512 may be projected directly into a screen space to look up the camera feed texture. This approach is fast, simple, and may not require deferred shading (unlike traditional implementations of screen space reflections) providing a benefit for mobile devices on which AR is popular.

In some implementation, the points projected outside a field of view of camera 502 may be initially assigned texture coordinates outside a valid range (e.g., [0, 1]), and have to be brought back into the valid range. There are several ways of bringing them into the valid range. In one example implementation, the two coordinates may be independently clamped to bring them into the valid range. In another example implementation, each coordinate may be mirrored as it exceeds the [0, 1] boundary, and reflecting the texture content horizontally, vertically, or both. In one more example implementation, the two coordinates may be adjusted so that they remain within the valid range region while preserving their direction relative to the center point (0.5, 0.5). These techniques reasonably and inexpensively extrapolate color along any direction from the center of the camera feed texture. Regardless of which technique is used to bring out-of-bounds texture coordinates into the valid range, visible artifacts may be produced due to obvious pixel replication. However, as the blending equation (2) described above falls off rapidly with increasing deflection of the reflected vector from the incident direction, such artifacts are generally unnoticeable.

In some implementations, in order to achieve proper blending between the environment map and the camera feed (that is, for proper blending of the environment map component 506 and the camera feed component 508), the brightness profiles of the environment map and the camera feed should roughly match. In other words, they should have visually similar brightness profiles. As the camera feed may have its brightness values of its pixels clamped at a value of 1 and the environment map has pixels with significantly higher brightness values, in some implementations, the camera feed may be scaled so that the brightest pixel of the camera feed matches a proportion (e.g., one half) of the brightest pixel of the environment map. Depending on the environment map, other adjustments/scalings might work as well, e.g., matching means, medians, etc.

For example, in an environment map with a direct view of the sun, an average value or a percentile near the median may be used for scaling the camera feed. In another example, in an indoor environment map covering a lower dynamic range of brightness, some fraction of the maximum brightness may be used. In some implementations, a final scaling factor based on locally filtered camera brightness (and color) may be applied via fake image-based lighting (fIBL) so that the camera feed still controls the ultimate brightness of the blended color to prevent, for example, reflections from becoming brighter than the pixels comprising the camera feed texture. In some implementations, a filtered camera feed may be used to approximate local illumination of an inserted computer-generated object. For example, a tone mapping operation on the camera feed may be used to satisfy (e.g., balance) two competing goals which may include brightening the camera feed for consistency with the cube map and absence of the brightening of the camera feed to allow the specular reflections appear noticeably brighter than the camera feed pixels they appear to reflect.

In some implementations, if computing device 102 has multiple cameras (e.g., a binocular AR rig), information from more than one camera (e.g., a plurality of cameras of the computing device 102) may be used to provide a wider field of view and thereby allowing valid camera feed component values over more directions and thereby eliminating the need to repair out-of-bounds texture coordinates by mirroring. In one example implementation, this may be achieved by computing homographies between all pairs of cameras. When a point projects outside a rendering camera's field of view, its homographies from the other cameras may be applied to the projection. A homography that brings the projection into a camera's field of view would allow the point to be sampled from that camera's feed and blended into the final result for determining the camera feed component 508.

In some implementations, the availability of information about the depths of surfaces being depicted in a camera feed may be used to render more accurate screen-space reflections, where camera feed projections may be computed at specific depths along reflection vector 506 instead of computing the camera feed projections at infinite depth. This could be implemented in several ways. In one example implementation, if a small number of oriented planes are provided, reflection vector 506 may be intersected with each plane and the nearest intersection accepted in the shader. In another example implementation, for more complex geometry, a depth map may be constructed and queried to find the nearest intersection along the camera ray. Once the nearest intersection is found, it may be projected into screen space and used for camera feed lookup as described above.

Figure 7:
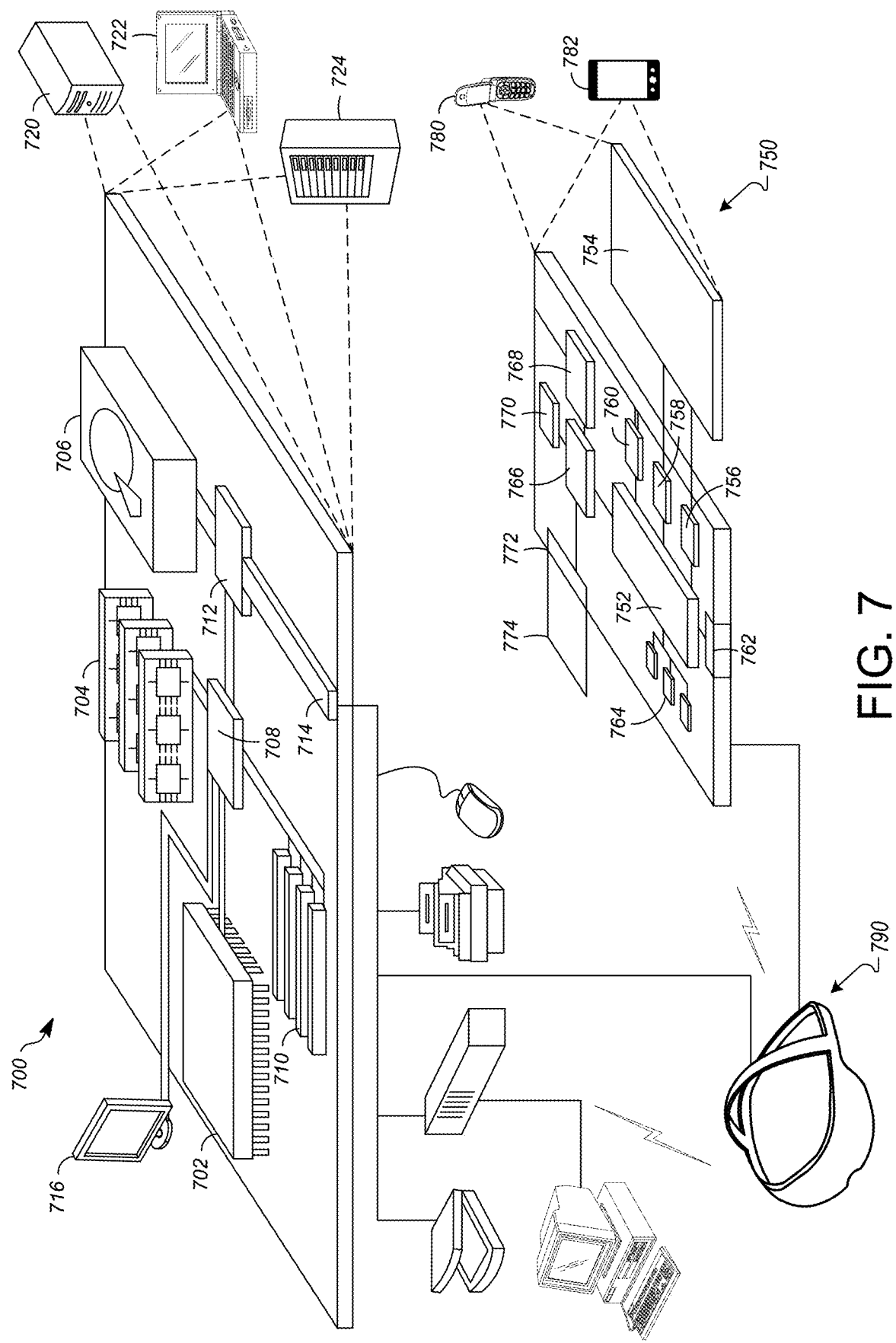
FIG. 7 shows an example of a computer device and a mobile computer device that can be used to implement the techniques described herein.

FIG. 7 shows an example of a computing device 700 and a mobile computing device 750, which may be used with the techniques described here. Computing device 700 includes a processor 702, memory 704, a storage device 706, a high-speed interface 708 connecting to the memory 704 and high-speed expansion ports 710, and a low speed interface 712 connecting to low speed bus 714 and the storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of function is an example implementation only, and is not meant to limit implementations of the disclosure described and/or claimed in this document. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device, such as computing device 750. Each of such devices may contain one or more of computing device 700, 750, and an entire system may be made up of multiple computing devices 700, 750 communicating with each other.

The computing device 750 includes a processor 752, memory 764, and an input/output device such as a display 754, a communication interface 766, and a transceiver 768, among other components. The computing device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the computing device 750, such as control of user interfaces, applications run by computing device 750, and wireless communication by computing device 750.

The processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of the computing device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to the computing device 750 through expansion interface 772, which may include, for example, a SIMM (Single In-Line Memory Module) card interface. Such expansion memory 774 may provide extra storage space for the computing device 750, or may also store applications or other information for the computing device 750. Specifically, expansion memory 774 may include instructions to carry out or supplement the processes described above, and may include secure information also. Thus, for example, expansion memory 774 may be provided as a security module for the computing device 750, and may be programmed with instructions that permit secure use of the computing device 750. In addition, secure applications may be provided via the SIMM cards, along with additional information, such as placing identifying information on the SIMM card in a non-hackable manner.

The memory 764 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory 764, expansion memory 774, or memory on processor 752, which may be received, for example, over transceiver 768 or external interface 762.

The computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, LTE, 5G/NR, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to the computing device 750, which may be used as appropriate by applications running on device 750.

The computing device 750 may also communicate audibly using audio codec 760, which may receive spoken information from a user and convert it to usable digital information. Audio codec 760 may likewise generate audible sound for a user, such as through a speaker, e.g., in the computing device 750. Such sound may include sound from voice telephone calls, may include recorded sound (e.g., voice messages, music files, etc.) and may also include sound generated by applications operating on the computing device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with an AR headset/HMD device 790 to generate an augmented environment for viewing inserted content within the physical space. For example, one or more sensors included on the computing device 750 or other computing device depicted in FIG. 7, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790.

In some implementations, a computing device 750 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

The computing device 700 is intended to represent various forms of digital computers and devices, including, but not limited to laptops, desktops, workstations, personal digital assistants, servers, blade servers, mainframes, and other appropriate computers. The computing device 750 is intended to represent various forms of mobile devices, such as personal digital assistants, cellular telephones, smart phones, and other similar computing devices. The components shown here, their connections and relationships, and their functions, are meant to be example implementations only, and are not meant to limit implementations of the disclosure described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   determining a first portion of a specular reflection associated with a computer-generated object based on a first contribution from an environment map component at a shading point of the computer-generated object;
   determining a second portion of the specular reflection associated with the computer-generated object based on a second contribution from a camera feed component at an intersection point of a camera feed and a reflection vector associated with the environment map component; and
   determining the specular reflection, at the shading point, associated with the computer-generated object based on a blending of the first and second portions of the specular reflection.

2. The method of claim 1, wherein the blending of the first portion and second portions of the specular reflection is based on an angle between a negated view vector and a surface normal vector, the negated view vector associated with the camera feed and the surface normal vector perpendicular to a surface of the computer-generated object.

3. The method of claim 1, wherein the environment map component at the shading point is determined based on an environment mapping of a surrounding environment.

4. The method of claim 3, wherein the environment mapping is based on cube mapping.

5. The method of claim 1, further comprising:
   determining whether light is being scattered from a surface of the computer-generated object; and
   blurring, in response to determining that the light is being scattered from the surface of the computer-generated object, an image of the camera feed prior to the determining of the camera feed component.

6. The method of claim 5, wherein the blurring of the image is performed using a mipmap filter.

7. The method of claim 1, wherein a color of a pixel at the intersection point represents a color of the camera feed component that is blended with the environment map component.

8. The method of claim 1, further comprising: clamping, independently, texture coordinates that project outside a valid range into the valid range.

9. The method of claim 1, further comprising:
determining a first brightness profile of an environment map associated with the environment map component and a second brightness profile of the camera feed associated with the camera feed component; and
scaling the second brightness profile of the camera feed as a proportion of the first brightness profile of the environment map.

10. The method of claim 1, wherein the blending is biased in favor of the camera feed component for higher angles between a negated view vector and a surface normal vector.

11. The method of claim 1, wherein the blending is biased in favor of the environment feed component for lower angles between a negated view vector and a surface normal vector.

12. An apparatus, comprising:
a processor; and
a memory, the memory including instructions configured to cause the processor to:
determine a first portion of a specular reflection associated with a computer-generated object based on a first contribution from an environment map component at a shading point of the computer-generated object;
determine a second portion of the specular reflection associated with the computer-generated object based on a second contribution from a camera feed component at an intersection point of a camera feed and a reflection vector associated with the environment map component; and
determine the specular reflection, at the shading point, associated with the computer-generated object based on a blending of the first and second portions of the specular reflection.

13. The apparatus of claim 12, wherein the blending of the first portion and second portions of the specular reflection is based on an angle between a negated view vector and a surface normal vector, the negated view vector associated with the camera feed and the surface normal vector perpendicular to a surface of the computer-generated object.

14. The apparatus of claim 12, wherein the environment map component at the shading point is determined based on an environment mapping of a surrounding environment.

15. The apparatus of claim 14, wherein the environment mapping is based on cube mapping.

16. The apparatus of claim 12, wherein the processor is further configured to: determine whether light is being scattered from a surface of the computer-generated object; and
blur, in response to determining that the light is being scattered from the surface of the computer-generated object, an image of the camera feed prior to the determining of the camera feed component.

17. The apparatus of claim 12, wherein a color of a pixel at the intersection point represents a color of the camera feed component that is blended with the environment map component.

18. The apparatus of claim 12, wherein the processor is further configured to: clamp, independently, texture coordinates that project outside a valid range into the valid range.

19. The apparatus of claim 12, wherein the processor is further configured to:
determine a first brightness profile of an environment map associated with the environment component and a second brightness profile of the camera feed associated with the camera feed component; and
scale the second brightness profile of the camera feed as a proportion of the first brightness profile of the environment map.

20. A non-transitory computer-readable storage medium having stored thereon computer executable program code which, when executed on a computer system, causes the computer system to perform a method, comprising:
determining a first portion of a specular reflection associated with a computer-generated object based on a first contribution from an environment map component at a shading point of the computer-generated object;
determining a second portion of the specular reflection associated with the computer-generated object based on a second contribution from a camera feed component at an intersection point of a camera feed and a reflection vector associated with the environment map component; and
determining the specular reflection, at the shading point, associated with the computer-generated object based on a blending of the first and second portions of the specular reflection.

* * * * *